United States Patent [19]
Johnsen et al.

[11] Patent Number: 5,988,842
[45] Date of Patent: Nov. 23, 1999

[54] APPARATUS FOR SHOWING LIGHT AT A DISTANCE FROM A LIGHT SOURCE

[76] Inventors: Roger T. Johnsen, 1866 London Plane Rd., Salt Lake City, Utah 84124; Robin M. Urry, 12712 Bird Dog Cove, Draper, Utah 84020; Matthew T. Bush, 770 Creekwood La. #8J, Salt Lake City, Utah 84107

[21] Appl. No.: 08/943,840

[22] Filed: Oct. 3, 1997

Related U.S. Application Data

[60] Provisional application No. 60/027,004, Oct. 4, 1996.

[51] Int. Cl.⁶ ........................................ F21V 8/00
[52] U.S. Cl. ..................... 362/551; 362/30; 362/85; 200/314; 385/901
[58] Field of Search ............................. 362/26, 27, 30, 362/31, 85, 290, 330, 354, 559, 560, 551, 581; 200/310, 313, 314, 317; 385/901

[56] References Cited

U.S. PATENT DOCUMENTS

| | | | |
|---|---|---|---|
| 2,998,597 | 8/1961 | Edwards | 362/27 |
| 4,454,399 | 6/1984 | Suzuki | 200/314 |
| 4,535,396 | 8/1985 | Guthrie | 362/27 |
| 4,778,966 | 10/1988 | Obata et al. | 200/314 |
| 4,800,466 | 1/1989 | Bauer et al. | 362/26 |
| 4,916,591 | 4/1990 | Schiele | 362/26 |
| 5,130,761 | 7/1992 | Tanaka | 257/88 |
| 5,327,328 | 7/1994 | Simms et al. | 362/26 |
| 5,349,504 | 9/1994 | Simms et al. | 362/555 |
| 5,481,440 | 1/1996 | Oldham et al. | 362/555 |

FOREIGN PATENT DOCUMENTS

| | | | |
|---|---|---|---|
| 263973 | 6/1964 | Netherlands | 362/31 |
| 448443 | 6/1936 | United Kingdom | 362/26 |

*Primary Examiner*—Alan Cariaso

[57] ABSTRACT

This invention is concerned with lightpipes and lightpipe arrays designed to redirect light from a mounted light source, such as a light-emitting diode (LED), or from an array of mounted light sources. The lightpipe and lightpipe array are advantageously designed to be mounted to a surface not directly in contact with the light source(s) or the surface on which the light source(s) is (are) attached and to redirect light such that light exits the lightpipe at an elevation between the elevation of the light-emitting end of the light source and the elevation of the surface mounting such light source after a plurality of light reflections within a lightpipe(s). Several methods for attachment of the lightpipes to a mounting panel are described. A preferred embodiment of the invention features attachment of the lightpipe or lightpipe array to a mounting panel using a bezel or bezels which substantially prevent interference from stray light sources and prevent light from mixing between lightpipes of an array. Another embodiment of the invention is in the form of an illuminated pushbutton end of a switchcap arrangement utilizing a vertically directed light source and an escutcheon to substantially prevent light from mixing between vertically adjacent switchcaps arrangement.

13 Claims, 5 Drawing Sheets

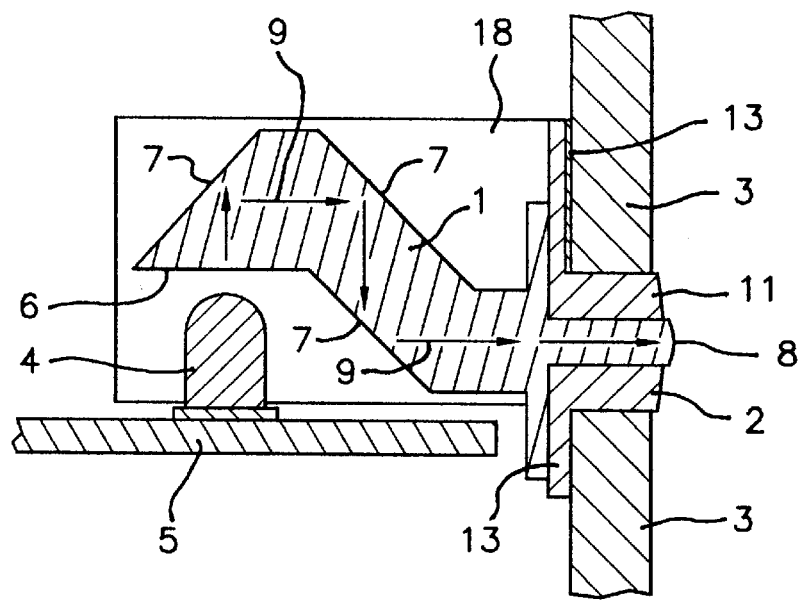
FIG. 1
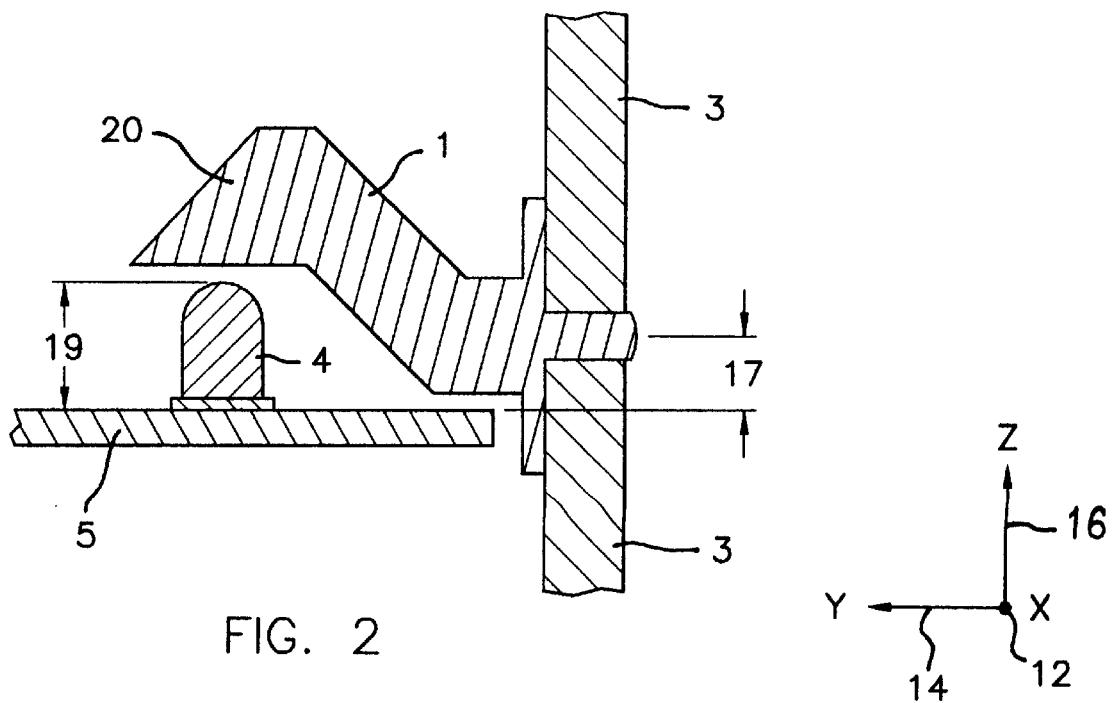
FIG. 2
FIG. 2A

APPARATUS FOR SHOWING LIGHT AT A DISTANCE FROM A LIGHT SOURCE

RELATED APPLICATION

This application claims the benefit of U.S. provisional application No. 60/027,004, filed Oct. 4, 1996.

BACKGROUND OF THE INVENTION

1. Field

The present invention is in the general field of fiber optics, more specifically in the field of lightpipes for transmitting and redirecting light through a solid medium that is light-transmissive.

2. State of the Art

Since the 1970's, right-angle, circuit-board-mounted, lighted indicators have been used to provide visual status information relating to the functions of electronic equipment with which they are used. These have typically been "through-hole" light-emitting diodes (LEDs) with leads bent at a right angle so the direction of light is parallel to the usually horizontally positioned, printed circuit boards on which they are mounted. They are typically directed through a usually vertically positioned front panel of the equipment concerned. Many manufacturers have designed right-angle, plastic housings for mounting flush on the circuit boards to which the LEDs are secured, resulting in easier and more precise X, Y, and Z directional alignment and better stability. A housing provides an alignment advantage over an LED with bent leads when soldering the LED to the circuit board, as well as when installing the circuit board assembly in the equipment chassis.

Some of these housings are designed with means to lock multiple housings together to form an either horizontally side-by-side or vertically aligned array of LEDs. Unfortunately, the design of many of these housings requires that the LED be inserted into the housing by hand and that the LED housing assembly be inserted into the circuit board by hand. Also, those housings that are designed to be locked together typically require human labor to assemble the array. For these reasons, as well as the fact that the housing itself is costly, LEDs in housings have been significantly more expensive than an LED by itself.

Also in the 1970's, lightpipe and fiber optic technology started to gain popularity as a means to redirect and transmit light, either for simple visual indication or for data communication. Later, in the late 1980's and the early 1990's with the increasing popularity of surface mounted LEDs, manufacturers developed ways to combine the automatic insertion advantages of surface mounted LEDs with the alignment advantages of LED housings, this by designing lightpipes and lightpipe arrays which mount to the circuit board and redirect light in the desired direction. These so-called "lightpipes" are again an increased cost over LEDs by themselves, but they require less hand labor to assemble and install and are not required to be installed on the circuit board before the soldering process. An aesthetic benefit of such lightpipes is that it is easy to create various shapes of lightpipe transmission surfaces, for example, as by making a square or triangle shaped indicator using a round LED as the light source.

U.S. Pat. Nos. 5,130,761, 5,327,328, and 5,349,504 disclose lightpipes or lightpipe arrays fabricated from a transparent material, each providing means for mounting the lightpipe or lightpipe array to the circuit board so that the X Y Z alignment issue is adequately addressed. The two latter of these patents also go into detail as to how lightpipes solve problems of weight, stability, and clearance for automatic equipment encountered when using LED housings. It should be noted that U.S. Pat. No. 5,327,328 refers to a method of connecting multiple lightpipes in such a way that an array can be molded as a single piece, while still substantially reducing light mixing from adjacent light sources. Although this method is somewhat successful, we have discovered that, under low light conditions, such method allows "crosstalk" between adjacent lightpipes which may be unacceptable in more critical applications.

The advantages of lightpipes over simple LEDs and LEDs with housings are widely recognized and account for their increasing popularity. Until recently, current use of lightpipes and lightpipe arrays all involved mounting them on the same circuit boards or panels on which the LED is directly mounted. With these known mounting systems, as well as with LEDs and LED housings, the process of assembling the circuit board in the chassis typically requires careful and sometimes difficult alignment of lightpipes with their corresponding holes in the chassis to ensure that the lightpipes are not scratched, dislodged, broken, or otherwise damaged. Mechanical tolerances between lightpipe, circuit board, circuit board-to-chassis mounting, and chassis can make this a time consuming and difficult procedure. Also, once installed in the chassis, the lightpipes are subject to damage due to the shifting of the circuit board and other mechanical components of the assembly through either normal or abusive handling of the equipment.

To overcome these problems, we determined that the lightpipe or lightpipe array must not be directly secured to the same board or panel on which the light source is secured. A creative solution was to mount the lightpipes on the front panel where they "float" above the light sources. Our lightpipe invention was completed before recently granted U.S. Pat. No. 5,481,440 was issued, which patent discloses a lightpipe array whereby the lightpipe has no direct contact with the LED or the surface on which the LED is mounted. As with our invention, the lightpipe is mounted on the front panel, addressing the aforementioned assembly and handling difficulties. However, the disclosure in U.S. Pat. No. 5,481,440, is (as well as current lightpipes in use are) limited to redirecting the light parallel to the mounting surface of the light source, at or above, but never below, the light-emitting end of the light source relative to the mounting surface. Redirecting light so it is emitted between the light-emitting end of the light source and the mounting surface for the light source has solved the problems remaining from the invention disclosed by the aforementioned U.S. Pat. No. 5,481,440. Our improvement provides the advantage of tighter vertical spacing of components within the assembly. This tighter vertical spacing may be necessary in a cramped assembly or may simply provide more freedom to choose the locations of lightpipes on the panel. With our equipment, the tighter vertical spacing was absolutely necessary.

Another problem with current designs is that, for lightpipe arrays, close spacing of adjacent lightpipes exhibit what may be an unacceptable amount of crosstalk between adjacent light sources and lightpipes which likely accounts for the wide spacing of adjacent lightpipes in U.S. Pat. No. 5,481,440.

SUMMARY OF THE INVENTION

A principal objective in the making of the present invention was to construct a lightpipe or lightpipe array and to associate it or them with a mounting board and a light-indicating panel so as to overcome the problems set forth above. In this connection, it was an objective to break the "mechanical tolerance loop" created when a lightpipe or LED or LED housing, or an array of such, is mechanically connected to a circuit board or panel, which assembly is then connected to a chassis mounting system and chassis, thereby easing assembly and improving mechanical reliability under stress. However, a more particular objective of the present invention was to construct a lightpipe or lightpipe array wherein light redirection is used to solve the problems.

Other particular objectives of the invention were to construct a lightpipe in such a way that alignment of a light source with a first surface of the lightpipe is not particularly critical in the X, Y, and Z directions for proper operation, regardless of typical mechanical tolerances encountered; to provide for a lightpipe array of adjacent lightpipes such that light from adjacent lightpipes will substantially not mix with adjacent lightpipes; and to provide means whereby crosstalk from adjacent light sources is reduced to the point of being negligible in worst case applications, such as in low light environments.

A final objective of the present invention was to provide for an embodiment of the lightpipe which is a push-button switchcap not directly connected to the circuit board or panel.

Novel features of the invention in accomplishing these objectives are, first, that the lightpipe, lightpipe array, and lightpipe push-button switchcap each have a first surface for alignment with the light source and through which light enters a passageway that comprises a plurality of reflecting surfaces for redirecting light in directions different from the first direction to reach a final surface through which the light exits and radiates as a visual indicator at a vertical elevation between the light-emitting end of the light source and the surface on which the light source is mounted, and second, the geometry of the lightpipe is preferably designed using ray tracing techniques such that the first light-receiving surface is oversized compared to the light-emitting area of the light source and that the second light-radiating surface is either undersized compared to the light-emitting area of the light source or that, in the case of the lightpipe switchcap, the passageway between the first and second surfaces narrows toward the second surface, thus reflecting and diffusing the light and spreading it evenly across the light radiating surface. This geometry makes alignment of the light source with the first surface of the lightpipe not critical in the plus or minus X and Y directions; while spacing between the light source and lightpipe allows for tolerance in the plus or minus Z direction, with only minor changes of light intensity at the second surface.

A third feature of the invention, the provision of an opaque "bezel" surrounding the light-emitting end posts of the lightpipe and through which such a portion of the lightpipe extends, serves a multiple purpose, preferably providing an aesthetically pleasing housing (as in the copending design patent application of James E. Holmes) in which the lightpipe or lightpipe array is secured, and otherwise providing a barrier, or in an array, barriers which substantially eliminate interference from stray light sources or crosstalk between adjacent lightpipes and light sources in an array.

A fourth feature of the invention includes an embodiment of the lightpipe which is a switchcap having similar light-redirecting features as on the lightpipes, but also having a socket end opposite the radiating surface, which socket end mates with a corresponding actuator post of a push-button switch.

A final feature of the invention is an injection-molded switchcap escutcheon, which provides a low-friction surface around the switchcap through which the switchcap may slide, as well as an opaque wall between vertically adjacent switchcaps to substantially eliminate light crosstalk.

THE DRAWINGS

The best modes presently contemplated for carrying out the invention are illustrated in the accompanying drawings in which:

FIG. 1 is a view in central vertical section of a single lightpipe and associated bezel mounted in a chassis panel with an associated light source in the form of a surface-mounted, through-hole LED on a circuit board;

FIG. 2, a similar view of a single lightpipe and associated components without a bezel;

FIG. 2A, a diagramatic showing of the three axes of concern;

FIG. 3, a front elevational view of an array of lightpipes secured in a bezel;

FIG. 4, a rear elevational view of the lightpipe array and bezel of FIG. 3;

FIG. 5, a top plan view of the lightpipe array and bezel of FIG. 3;

FIG. 6, a cutaway perspective view of a six-position lightpipe array and bezel mounted in a chassis panel;

FIG. 7, a side elevational view of a lightpipe, push-button, switchcap assembly and associated switch as mounted on a circuit board;

FIG. 8, a top plan view of the switchcap, switch, and circuit board of FIG. 7;

FIG. 9, a perspective view of a dual switchcap escutcheon for vertically adjacent switchcaps; and FIG. 10, a vertical sectional view taken centrally through vertically adjacent switchcaps with their associated switches and circuit boards, a dual switchcap escutcheon being attached to the chassis panel.

DETAILED DESCRIPTION OF THE ILLUSTRATED EMBODIMENTS

Figure 3:
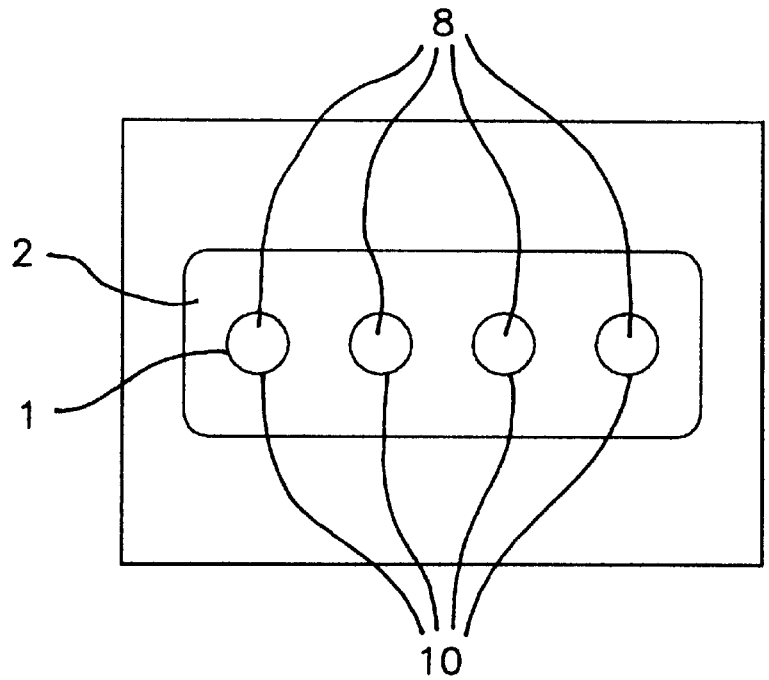

FIG. 1 shows a lightpipe 1, lightpipe bezel 2, front panel 3, LED light source 4, and circuit board 5. The lightpipe 1 is composed of a light transmissive material, such as acrylic or polycarbonate, and is either injection molded separately from the bezel 2 or both lightpipe and bezel may be injection molded together in a two-shot process. If molded separately, there are a variety of well-known means for joining them, including adhesive, sonic welding, and heat staking. The bezel 2 is molded from an opaque material, typically a plastic well-known as ABS. As shown, decorative portion 11 of the bezel 2 protrudes slightly from the panel 3 in which it is mounted, while flat surface 13 butts up against the rear of the panel 3. Light emitted by the LED 4 enters a first surface 6 and moves through the lightpipe 1, reflecting off a plurality of reflecting surfaces 7, and eventually exiting through the light radiating surface 8. Ray tracing 9 indicates the path that the light takes through the lightpipe 1. Note that the light radiating surface 8, i.e., the light-emitting end of the lightpipe 1, is smaller than the LED 4 diameter, making precise X-axis 12 and Y-axis 14, FIG. 2A, alignment of the lightpipe 1 with the first surface 6 non-critical. Note from FIG. 2A that the X-axis 12 is shown directed into the drawing sheet. Obviously, slight misalignment along the Z-axis 16 has little effect upon operation.

FIG. 2 shows the single lightpipe 1 and its associated LED 4 and circuit board 5 mounted to the panel 3 without the use of a bezel. Again, the lightpipe 1 may be secured by adhesive, sonic welding, or by a variety of well-known means. From elevation dimensions 17 and 19, it is seen that, in this arrangement, as well as that of FIG. 1, light exits at a lower elevation 17 than the elevation 19 of the light-emitting top of the light source 4, i.e., between the light-emitting upper end of the LED 4 light source and the mounting surface of such light source.

FIG. 3 shows a plurality of lightpipes 1 in an array 10 that is secured in an elongate bezel 2 surrounding the light-emitting ends, i.e. radiating surfaces 8, of the lightpipes 1. In this figure, a round shape for the radiating surfaces 8 is illustrated, but many shapes can be practically realized.

Figure 4:
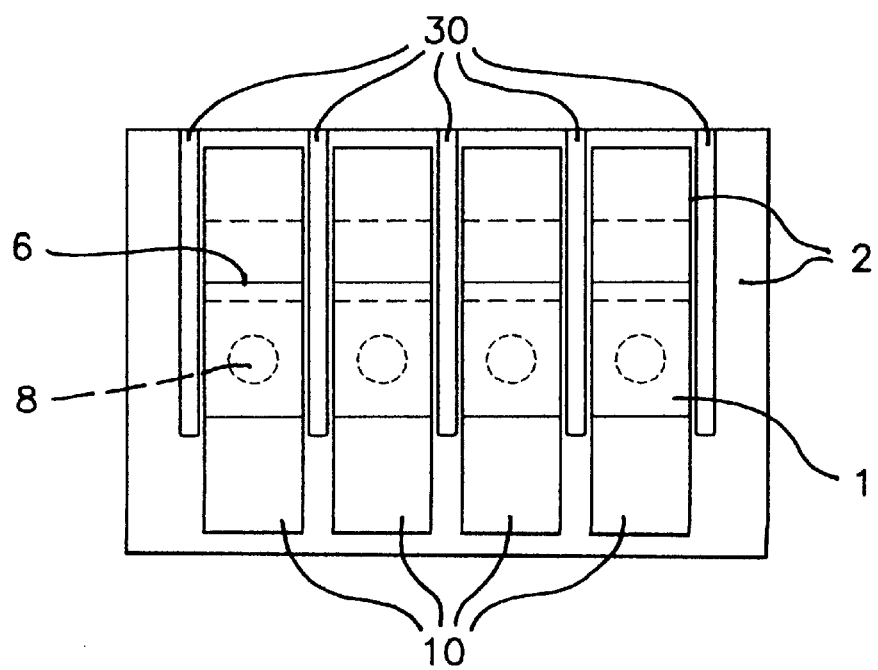

FIG. 4 shows walls 30 as part of bezel 2, which substantially eliminate crosstalk between adjacent lightpipes 1 and respective light sources. Dashed outlines of the radiating surfaces 8 and the first surfaces 6 are pointed out for reference.

Figure 5:
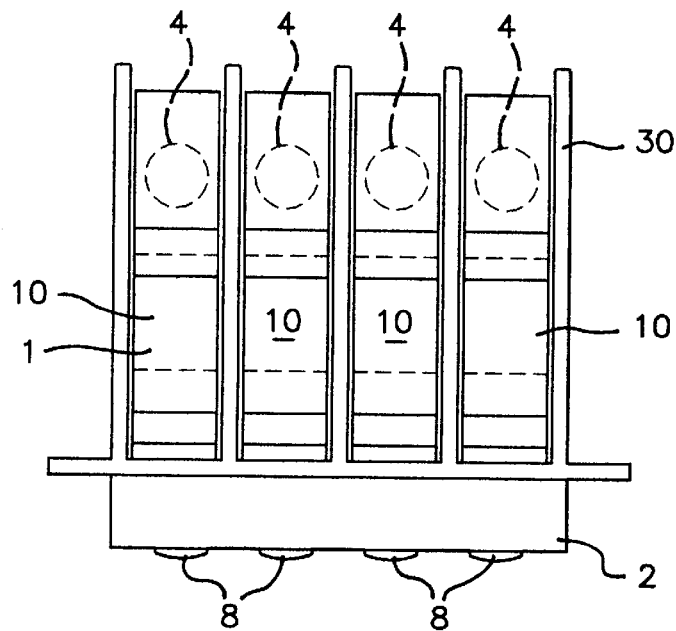

FIG. 5 shows the lightpipe array 10 and bezel 2 of FIG. 3 and clarifies how the walls 30 extend back beyond the lightpipes to substantially eliminate crosstalk. Dashed outlines of the LEDs 4 show their positional relationship to the lightpipes 1.

Figure 6:
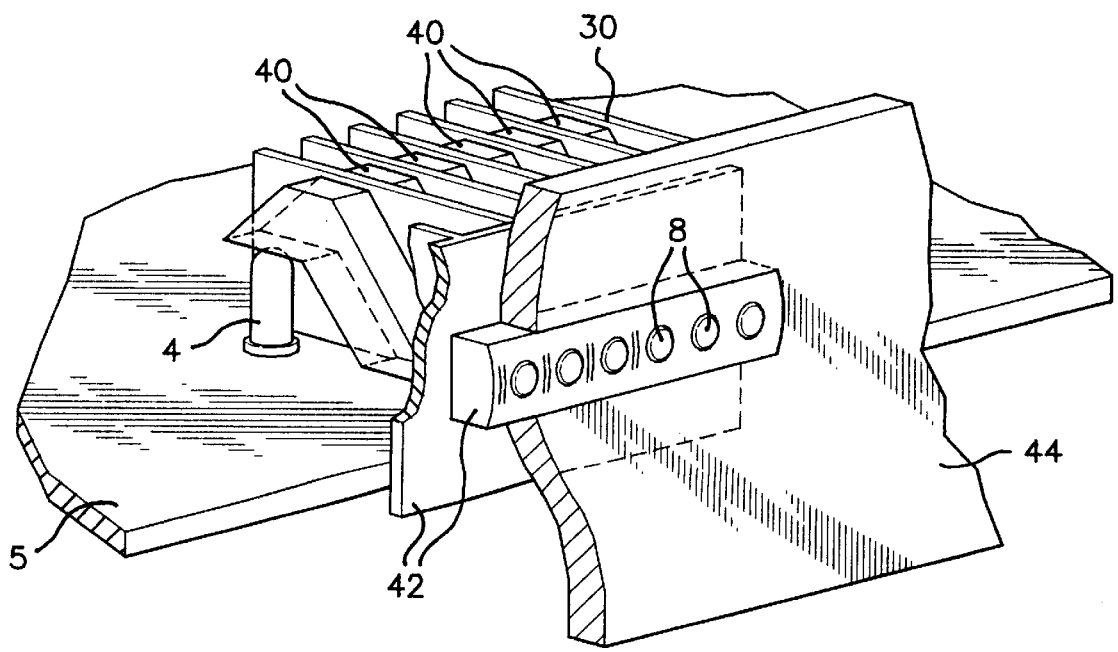

FIG. 6 shows a six-position lightpipe array 40 and an elongate bezel 42 for the array mounted in a panel 44 with associated LEDs 4 mounted on a circuit board 5 showing light barrier walls 30 and light radiating surfaces 8 constituting the light-emitting ends of respective lightpipes.

Figure 7:
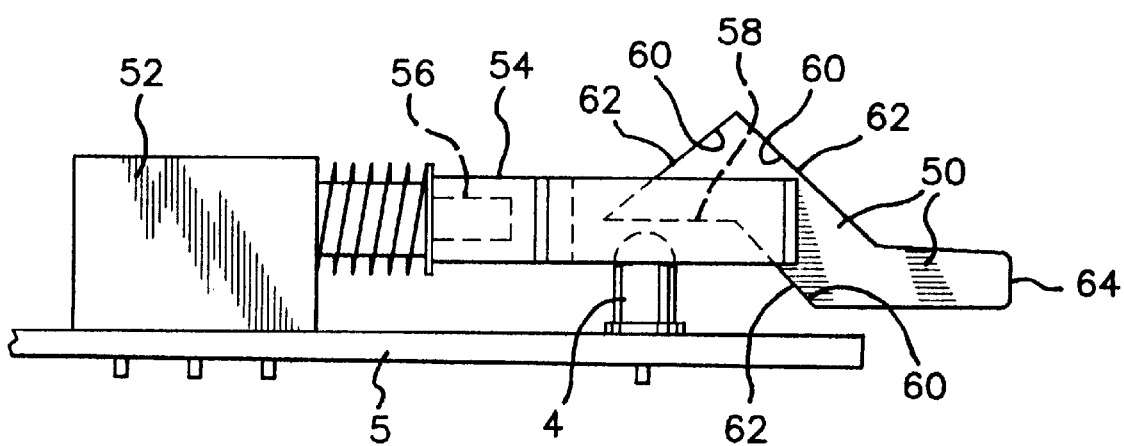

FIG. 7 shows a lightpipe 50 as a switchcap 54 and push-button 64 arrangement, with associated switch 52 and LED 4 light source, mounted on a circuit board 5. The switchcap 54 has a socket end which mates with an actuator post 56 of the switch 52. Lightpipe 50 has a first surface 58, which is aligned with an LED light source 4, and a plurality of reflecting surfaces 60 for redirecting light from the light source 4. Light is eventually "funneled" by sloping angular sides 62 of the lightpipe 50 and diffused at the radiating, light-emitting end 64 thereof. Actuating the switch 52 to the "on" position by pushing the light-emitting, pushbutton end 64 of lightpipe 50 aligns the first surface 58 correctly over, and turns on, the LED 4. As with the design of the other lightpipes 1 and 20, the X, Y, and Z alignment, FIG. 2A, is not critical and light exits the radiating, light-emitting, pushbutton end 64 at an elevation between the light-emitting top of light source 4 and the light source mounting surface of board 5.

Figure 8:
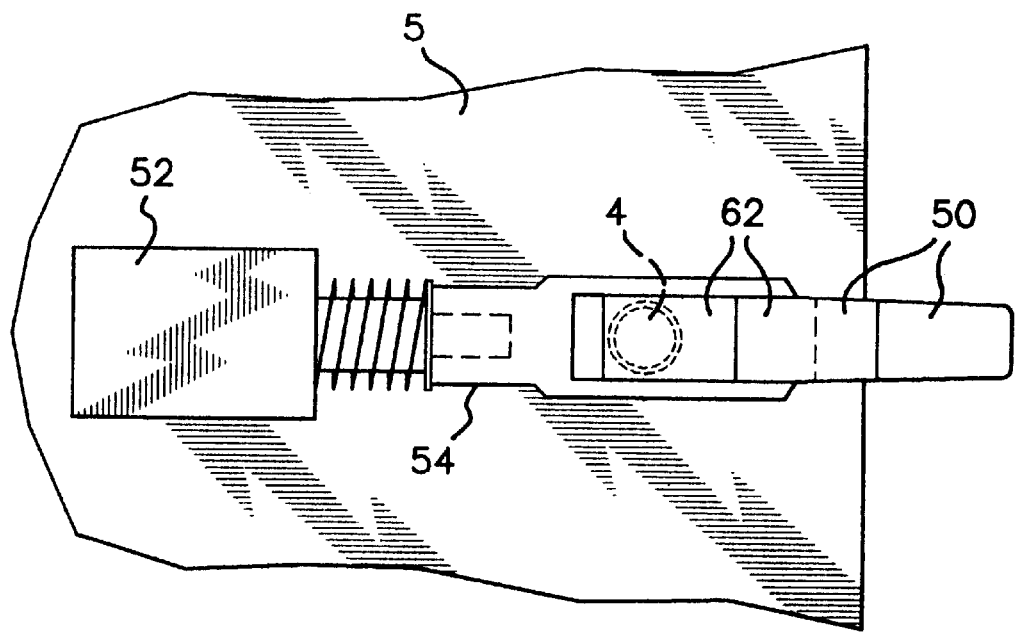

FIG. 8 shows lightpipe 50, switchcap 54, and associated switch 52 and LED 4 light source mounted on circuit board 5, as in FIG. 7, but clarifies the preferred construction of lightpipe 50 with angled sides.

Figure 9:
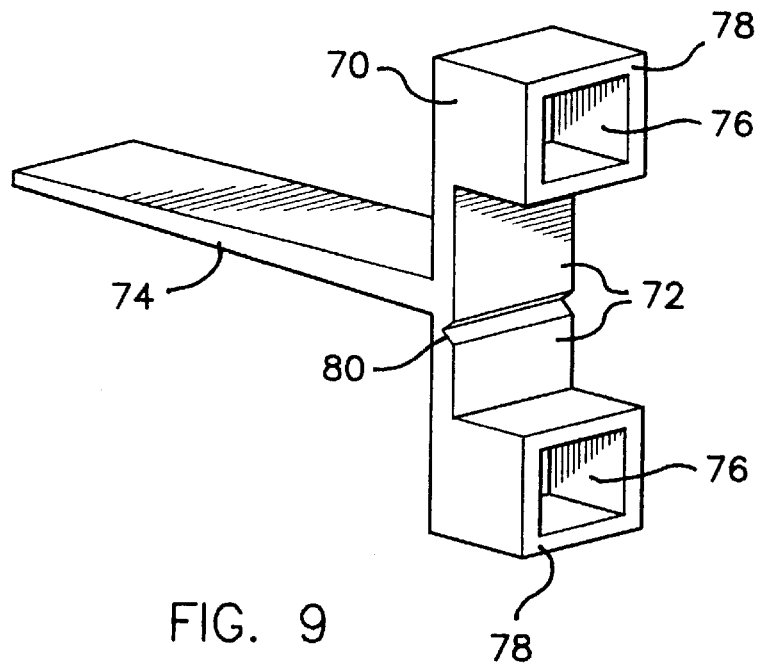
Figure 10:
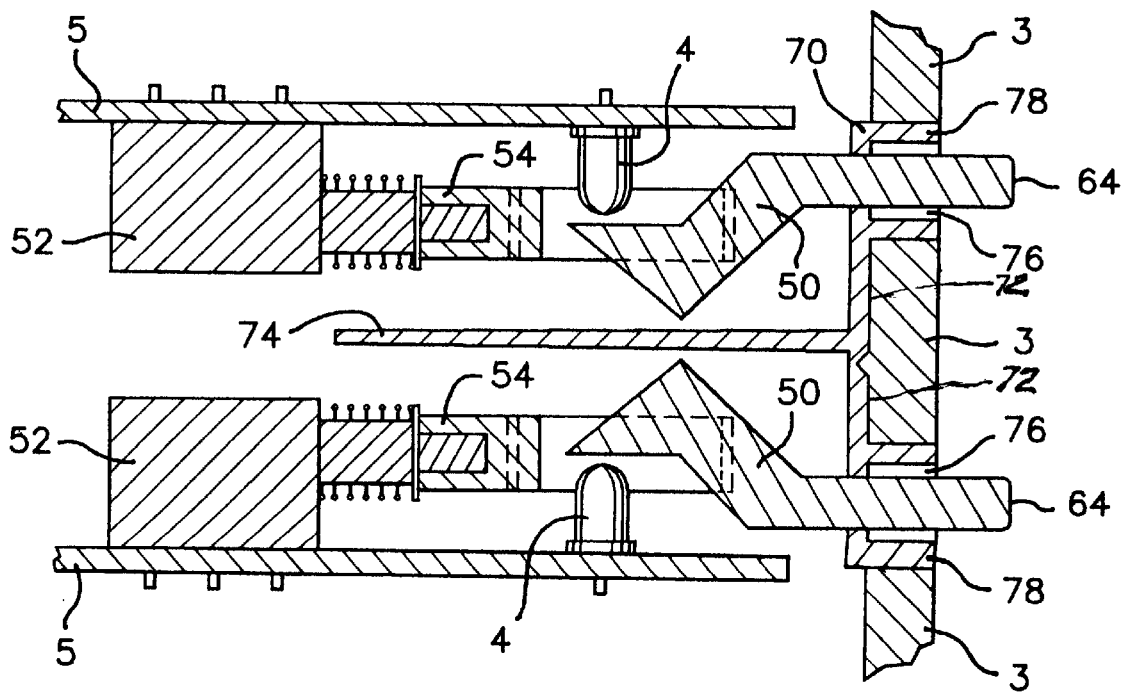

FIG. 9 shows a single piece, injection molded, dual switchcap escutcheon 70 for a set of vertically adjacent lightpipes 50 as in the array of FIG. 10. A press fit, as well as adhesive on surface 72 adequately secures the escutcheon 70 to a panel 3. A baffle 74 in the set serves to substantially eliminate crosstalk from the vertically adjacent sets of light sources 4 and from the pushbutton, light-emitting ends of lightpipes 50. The lightpipe end portions of the respective sets are inserted through openings 76, respectively, in surrounding frames 78, which serve to support the lightpipes without friction-induced binding. A notch 80 allows the escutcheon 70 to be broken into two pieces to be used should the LED light sources and the switchcaps of a set not be vertically aligned.

FIG. 10 shows the set of FIG. 9 in a vertically aligned array having respective lightpipes 50 and associated switchcaps 54, "through hole" LEDs 4, respective switches 52, and respective circuit boards 5. The dual escutcheon 70 is attached to a panel 3. From this FIG. 10, it is clear that the light barrier wall 74 of each set is needed, since light from the adjacent light sources could easily crosstalk into each other.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow. Thus, variations of the specific apparatus that are within the skill of the art should be considered to be within the scope of the claims that follow.

What is claimed as new and advantageous and desired to be protected by patent is:

1. Apparatus for showing light at a distance from a light source, comprising a light source mounted at a given level and having a light-emitting end at a different level; a lightpipe having a light-entry end substantially at the light-emitting end of the light source and positioned to receive light therefrom, said lightpipe extending the distance to where the light is shown and having a light-emitting end substantially thereat, said light emitting end of the lightpipe being at a level between the level at which the light source is mounted and substantially the level of the said light-emitting end of the light source; and the lightpipe having a plurality of light-reflecting surfaces that direct the light to the level of said light-emitting end of the lightpipe.

2. Apparatus according to claim 1, wherein such apparatus is in an array of such apparatuses.

3. Apparatus for showing light at a distance from a light source, comprising a light source mounted at a given level on a substantially horizontal surface of an electrical circuit board and having a light-emitting end at a different level; a lightpipe extending through an opening in a substantially vertical viewing panel, with a light-emitting end exposed substantially at a face of the panel that is directed away from the light source, said lightpipe having a light-entry end substantially at the light-emitting end of the light source and positioned to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; the light-pipe having a plurality of light-reflecting surfaces that direct the light to the level of said light-emitting end of the lightpipe; and opaque bezel mounted in said opening of said viewing panel, said light-emitting end of the lightpipe extending into said bezel.

4. Apparatus according to claim 3, wherein such apparatus is in an array of such apparatuses.

5. Apparatus for showing light at a distance from a light source, comprising a light source mounted at a given level and having a light-emitting end at a different level; a lightpipe having a light-entry end substantially at the light-emitting end of the light source and positioned to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; and the lightpipe having a plurality of light-reflecting surfaces that direct the light to the level of said light-emitting end of the lightpipe, wherein such apparatus is in an array of such apparatuses, and said apparatuses of the array are arranged side-by-side substantially horizontally.

6. Apparatus for showing light at a distance from a light source, comprising a light source mounted at a given level and having a light-emitting end at a different level; a lightpipe having a light-entry end substantially at the light-emitting end of the light source and positioned to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; and the lightpipe having a plurality of light-reflecting surfaces that direct the light to the level of said light-emitting end of the lightpipe, wherein such apparatus is in an array of such apparatuses, and such apparatuses of the array are arranged one above the other.

7. Apparatus for showing light at a distance from a light source, comprising a light source mounted on a substantially horizontal surface of an electrical circuit board and having a light-emitting end at a different level; a lightpipe extending through an opening in a substantially vertical viewing panel, with a light-emitting end exposed substantially at a face of the panel that is directed away from the light source, said lightpipe having a light-entry end above and extending over the light-emitting end of the light source to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; the lightpipe having a plurality of light-reflecting surfaces that direct the light to the level of said light-emitting end of the lightpipe.

8. Apparatus according to claim 3, wherein the bezel means is an elongate bezel having walls extending backwardly therefrom between adjacent lightpipes to prevent interference from stray light sources.

9. Apparatus for showing light at a distance from a light source, comprising a light source mounted at a given level on a substantially horizontal surface of an electrical circuit board and having a light-emitting end at a different level; a lightpipe extending through an opening in a substantially vertical viewing panel, with a light-emitting end exposed substantially at a face of the panel that is directed away from the light source, said lightpipe having a light-entry end substantially at the light-emitting end of the light source and positioned to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; and the lightpipe having a plurality of light-reflecting surfaces that direct the light to the level of said light-emitting end of the lightpipe, wherein such apparatus is in an array of such apparatuses, and the lightpipes of the respective apparatuses of the array pass through corresponding openings in the panel into which corresponding bezels are mounted, respectively.

10. Apparatus for showing light at a distance from a light source, comprising a light source mounted at a given level and having a light-emitting end at a different level; a lightpipe having a light-entry end substantially at the light-emitting end of the light source and positioned to receive light therefrom, said lightpipe extending the distance to where the light is shown and having a light-emitting end substantially thereat, said light-emitting end of the lightpipe being at a level between the level at which the light source is mounted and substantially the level of the said light-emitting end of the light source; and the lightpipe having a plurality of light-reflecting surfaces that direct the light to the level of said light-emitting end of the lightpipe, wherein the light source and the lightpipe constitute part of a switch and a switchcap assembly, with the light-entry end of the lightpipe connected to one end of the switchcap, the other end of the switchcap being connected to the switch, and the light-emitting end of the lightpipe serving as a pushbutton for activating the switch.

11. Apparatus according to claim 10, wherein the light-emitting end portion of the lightpipe extends through a frame portion of an escutcheon.

12. Apparatus according to claim 11, wherein there is an array of switch and switchcap assemblies arranged one above another substantially vertically, the frames of mutually adjacent escutcheons being integrally joined to provide a set or sets of escutcheons, each set having a baffle extending from the joinder of said mutually adjacent frames and longitudinally of the lightpipes and switchcaps of the set; and a plurality of said sets joined above one another to provide a substantially vertical array of the apparatuses.

13. An escutcheon for accommodating at least a pair of lightpipe apparatuses arranged as a mutually adjacent array of said apparatuses, said escutcheon comprising at least a pair of frames for receiving said lightpipe apparatuses, respectively, said frames being joined together by a joinder member therebetween with an elongate, light barrier baffle extending longitudinally from the joinder member between and away from each joined pair of frames so that light from mutually adjacent lightpipes of the frame-accommodated lightpipe apparatuses will substantially not mix.

\* \* \* \* \*